(12) United States Patent
Pikielny

(10) Patent No.: US 9,863,738 B2
(45) Date of Patent: Jan. 9, 2018

(54) FIREARM SAFETY CASE WITH BATTERY RECHARGER

(71) Applicant: Dov Pikielny, Herzliya (IL)

(72) Inventor: Dov Pikielny, Herzliya (IL)

(*) Notice: Subject to any disclaimer, the term of this patent is extended or adjusted under 35 U.S.C. 154(b) by 0 days.

(21) Appl. No.: 15/259,322

(22) Filed: Sep. 8, 2016

(65) Prior Publication Data
US 2016/0377374 A1 Dec. 29, 2016

Related U.S. Application Data

(63) Continuation-in-part of application No. 14/331,340, filed on Jul. 15, 2014, now Pat. No. 9,441,911.

(51) Int. Cl.
| | |
|---|---|
| *F41C 33/06* | (2006.01) |
| *F41A 17/44* | (2006.01) |
| *F41A 17/64* | (2006.01) |
| *F41A 29/02* | (2006.01) |
| *H02J 7/00* | (2006.01) |

(52) U.S. Cl.
CPC .............. *F41C 33/06* (2013.01); *F41A 17/44* (2013.01); *F41A 17/64* (2013.01); *F41A 29/02* (2013.01); *H02J 7/0027* (2013.01); *H02J 7/0044* (2013.01)

(58) Field of Classification Search
CPC .............. F41C 33/06; B65B 5/04; B60R 7/14
USPC .......................... 206/317, 1.5; 224/912, 913
See application file for complete search history.

(56) References Cited

U.S. PATENT DOCUMENTS

| 3,307,755 | A  | * | 3/1967 | Lentz ...................... | F41C 33/06 |
|---|---|---|---|---|---|
| | | | | | 206/317 |
| 6,843,081 | B1 | * | 1/2005 | Painter ................... | F41C 33/06 |
| | | | | | 109/45 |
| 2011/0036747 | A1 | * | 2/2011 | Petrick .................. | G06F 1/1628 |
| | | | | | 206/701 |
| 2012/0048755 | A1 | * | 3/2012 | Tsao ..................... | H01M 10/465 |
| | | | | | 206/320 |

* cited by examiner

*Primary Examiner* — King M Chu
(74) *Attorney, Agent, or Firm* — Dekel Patent Ltd.; David Klein

(57) ABSTRACT

Apparatus for storing therein a firearm includes a firearm case including walls and defining therein a volume for storing therein a firearm. A recharger is configured for recharging a battery of an electronic device. The recharger is in electrical communication with an access port located in a portion of the firearm case.

7 Claims, 3 Drawing Sheets

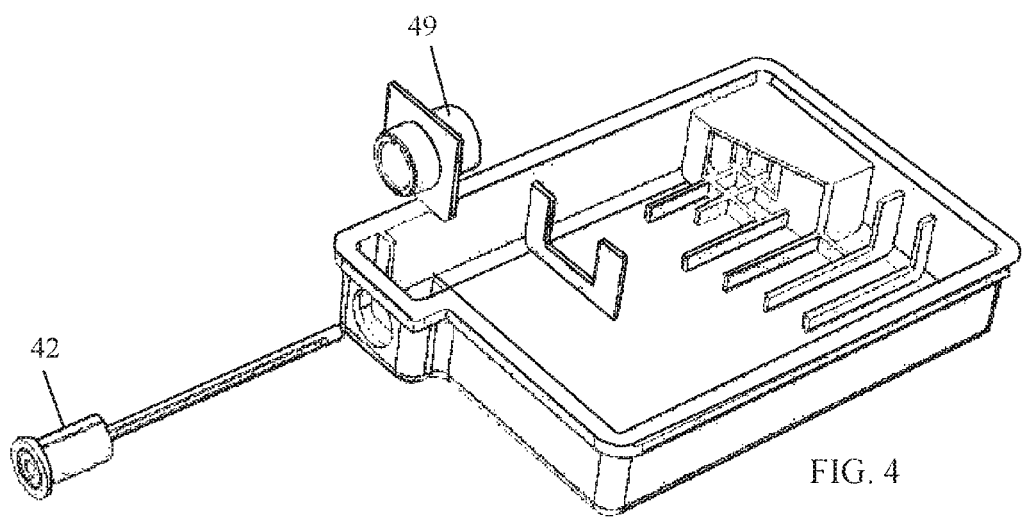
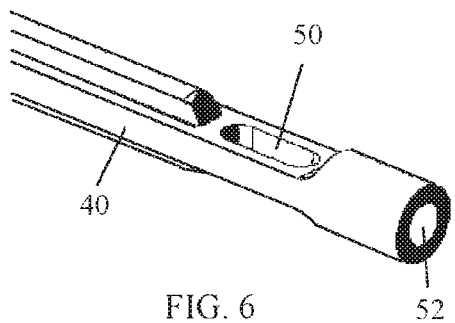
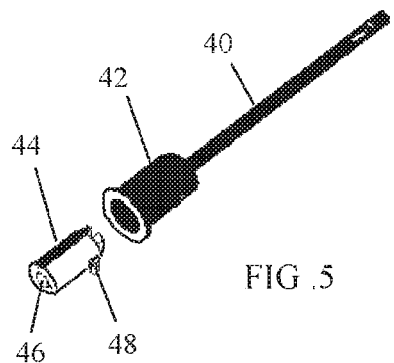

FIREARM SAFETY CASE WITH BATTERY RECHARGER

CROSS-REFERENCE TO OTHER APPLICATIONS

This application is a continuation-in-part of U.S. patent application Ser. No. 14/331340, filed 15 Jul. 2014, now U.S. Pat. No. 9,441,911, and claims priority therefrom.

FIELD OF THE INVENTION

The present invention relates generally to cases for firearms, and particularly to such a case with advanced safety features.

BACKGROUND OF THE INVENTION

A gun owner naturally must have a safe storage means to protect a gun against accidental discharge or misuse. However, in the prior art, the mere enclosure of a firearm in a closure or lockable enclosure has not afforded protection against unauthorized or accidental use. In particular, such protection of the past has not protected against the accidental discharge of a loaded weapon, either from within the enclosure or after removal, authorized or unauthorized, from the enclosure. Unfortunately many individuals carry their firearms in storage cases in an unsafe condition, wherein the firearm is actually cocked, ready to shoot. Sometimes the firearm is not cocked but there is a live round in the chamber. Once the owner or other individual takes the firearm out of the case, they may inadvertently hold the firearm by the grip, pull the trigger and shoot.

Complicated devices of the past have provided some form of lock on the trigger guard (that is, aside from the normal gun safety mechanism) inhibiting the pulling of a trigger. Some devices have, especially in the case of revolvers, provided rods locked in the barrels of guns inhibiting rotation of the cylinder against the firing of a loaded chamber in position to be fired.

U.S. Pat. Nos. 3,307,755 and 3,369,721 to Lentz describe a firearm safety box provided with a safety rod that ensures a firearm has no bullet in its chamber while properly in such a box. The safety rod is inserted into the barrel. The safety rod end is of a length to extend the entire length of the barrel and the bullet chamber. A clip safety rod is also provided that protrudes into the magazine well.

However, a disadvantage of Lentz is that it is essential to manufacture the box and safety rod for only one particular model of firearm. As stated in Lentz, the positioning of the mounting bar is particularly gauged so that only the particular model automatic pistol may fit into the firearm safety box. The thickness of the inside dimension of the firearm safety box is such that the automatic pistol will fit snugly inside the firearm safety box and the firearm safety box could not otherwise close with another firearm placed in the firearm safety box even if the safety rod and clip safety rod were properly engaged.

SUMMARY OF THE INVENTION

The present invention seeks to provide a safe carrying case for firearms (handguns, pistols, revolvers, rifles, etc.), and which may be lockable, as is described more in detail hereinbelow. In one embodiment, the carrying case includes a recharger for recharging batteries of electronic devices, such as but not limited to, electrically operated firearms, personal communication devices and more.

The present invention prevents storing the firearm in an unsafe position and loaded with ammunition. The user of the firearm can understand and see, even externally, that if the firearm is stored inside the box, then the firearm is certainly cleared, in a safe position. The case is universal for different models of the same manufacturer but not limited to the same manufacturer (such as Springfield, SIG, Smith and Wesson, Beretta and others). Indeed, the case can be fashioned for use with firearm models of several manufacturers, by employing a specific insert (sometimes even the insert is not needed) for each individual manufacturer; however, the lengths of the barrel and the caliber do not affect the performance of the cleared firearms case.

The invention includes novel structure that ingeniously exploits a feature which has escaped the prior art. For a given line of firearms of a given manufacturer, the distance between the back part of the pistol/grip and the firing pin surface is always fixed. In the case of pistols, for example, there is a fixed size of the grip in calibers of 9 mm and 0.40 (the length of the ammunition is the same). For pistols of caliber 0.45 the length of the grip is slightly longer (typically less than 3 mm). In accordance with an embodiment of the present invention, the case has alignment structure attached to one wall of the case, so that all firearms of a given line of firearms having different barrel lengths are always placed in the same exact place, such that the distance from the alignment structure to the front surface of the firing pin is always the same (within a tolerance of typically ±1-2 mm, without limitation). A safety rod of a fixed length inserted from the opposite wall into the barrel will always reach the firing pin surface, regardless through which barrel length the rod has to cross. Thus, in contrast to the case of Lentz which requires a custom carrying case for each individual firearm, in the present invention, a single carrying case is used for an entire line of firearms having different lengths of barrels.

In accordance with an embodiment of the present invention, the rod can be used as a cleaning rod and/or a stopper on the other side of the case, and may form part of a lock for locking the rod to the firearm and to the case.

There is provided in accordance with an embodiment of the present invention apparatus for storing therein a firearm, the firearm being one of a given line of firearms of a given manufacturer that have different barrel lengths, the firearm having a barrel and a firing pin, the apparatus including a firearm case including walls, alignment structure extending from one of the walls positioned to abut against a rear surface of one of the firearms of the given line of firearms placed in the firearm case such that a distance from the alignment structure that abuts against the firearm to a front surface of the firing pin of the firearm is equal for all the given line of firearms of the given manufacturer that have different barrel lengths, and a safety rod of a fixed length insertable into the barrel of the firearm, the fixed length being such that an end of the safety rod always reaches the front surface of the firing pin, regardless of the barrel length.

In accordance with an embodiment of the present invention an end of the safety rod opposite the end that reaches the firing pin includes a receptacle in which a lock is disposed for locking the safety rod to at least one of the firearm case and the firearm.

In accordance with an embodiment of the present invention the safety rod is formed with an aperture for receiving therein a cleaning cloth or brush.

In accordance with an embodiment of the present invention the firearm case includes a hinged cover with an aperture for passing through the safety rod.

There is also provided in accordance with an embodiment of the present invention a method for storing a firearm, the firearm being one of a given line of firearms of a given manufacturer that have different barrel lengths, the firearm having a barrel and a firing pin, the method including placing a firearm in a firearm case, the firearm case including walls, alignment structure extending from one of the walls positioned to abut against a rear surface of one of the firearms of the given line of firearms placed in the firearm case such that a distance from the alignment structure that abuts against the firearm to a front surface of the firing pin of the firearm is equal for all the given line of firearms of the given manufacturer that have different barrel lengths, and a safety rod of a fixed length insertable into the barrel of the firearm, the fixed length being such that an end of the safety rod always reaches the front surface of the firing pin, regardless of the barrel length, and placing the safety rod in the barrel of the firearm.

BRIEF DESCRIPTION OF THE DRAWINGS

The present invention will be understood and appreciated more fully from the following detailed description taken in conjunction with the drawings in which:

FIG. 4 is a simplified exploded pictorial illustration of elements of the firearm case of FIG. 1;

FIG. 5 is a simplified pictorial illustration of a safety rod of the firearm case of FIG. 1, showing a lock for locking the rod to the firearm and case;

FIG. 6 is a simplified pictorial illustration of a safety rod of the firearm case of FIG. 1, showing provisions for a cleaning cloth or cleaning brush.

DETAILED DESCRIPTION OF EMBODIMENTS

Figure 1:
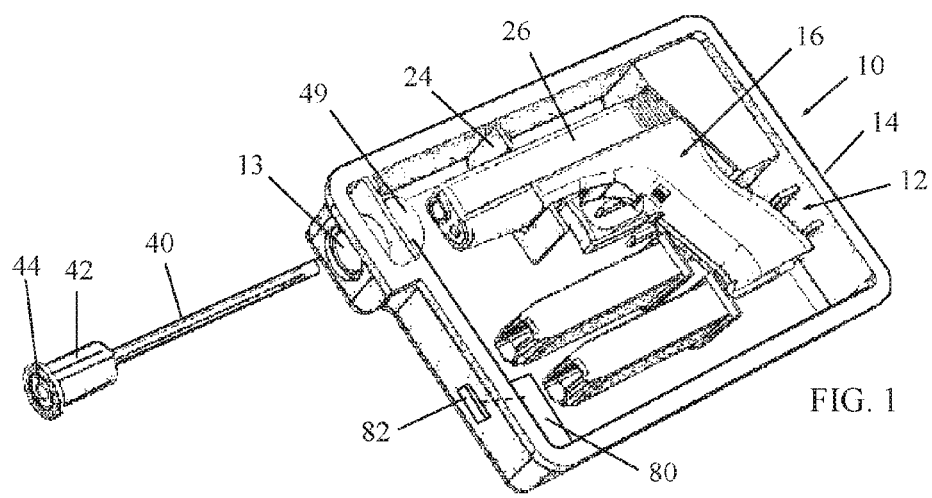
FIGS. 1, 2 and 3 are simplified cutaway pictorial, plan-view and top-view illustrations, respectively, of a firearm case constructed and operative in accordance with an embodiment of the present invention.
Figure 2:
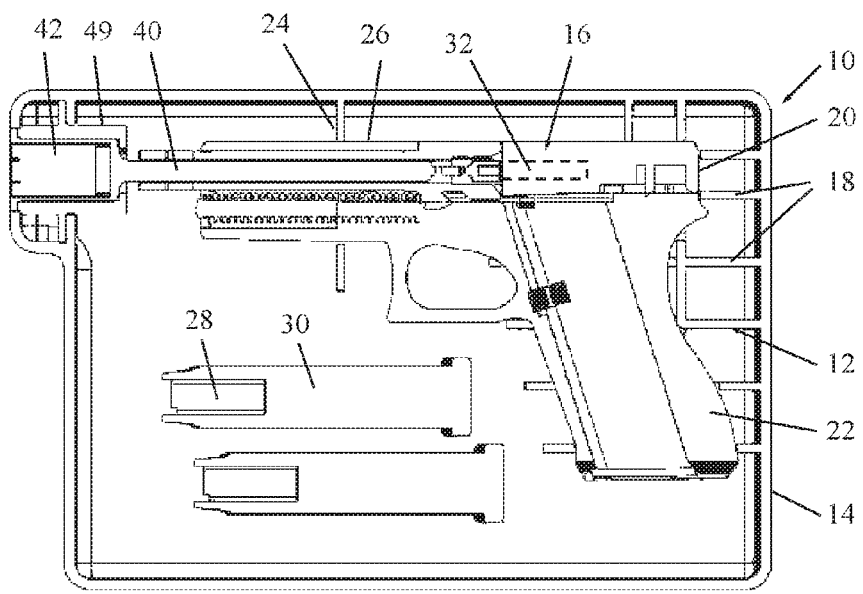
Figure 3:
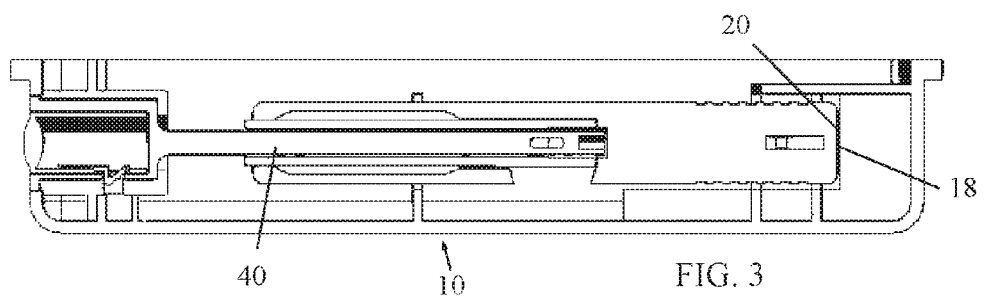

Reference is now made to FIGS. 1-3, which illustrates a firearm case 10, constructed and operative in accordance with an embodiment of the present invention. Firearm case 10 is used to safely house a firearm 16. The illustrated firearm used with the case is a type of handgun, but this is merely for the sake of simplicity and clarity, and the present invention is in no way limited by this particular illustrated construction.

Firearm 16 includes, among other components, a slide 20, a grip 22, a barrel 26 and a firing pin (also referred to as a striker) 32. Those skilled in the art will readily appreciate that only those parts of firearm 10 that are needed to explain the present invention are shown, but the firing assembly of firearm 16 in actuality may include many other parts, such as but not limited to, a breech block, a trigger, a trigger bar, a sear and various springs that are well known in the art and (are) therefore do not require detailed description and are omitted in the drawing for the sake of simplicity.

Firearm case 10 may be made of injection-molded plastic, or of any other suitable material, such as but not limited to, metal or wood.

Firearm case 10 includes alignment structure 12 extending from a wall 14 positioned to abut against a rear surface of firearm 16 placed in firearm case 10. In the illustrated non-limiting embodiment, alignment structure 12 includes ribs 18 that abut against the rear face of the slide 20 and/or the grip 22. One or more other abutments 24 are positioned in the case 10 to support firearm 16, such as an abutment 24 that straddles the barrel 26. The case 10 may include one or more other holding elements 28 for holding accessories, such as but not limited to, magazines 30.

Manufacturers of firearms often have a line of firearms that differ in the length of the barrel. For example, SPRINGFIELD ARMORY of Geneseo, Ill., USA manufactures a line of handguns under the trade name XD. There are different firearms in the XD line, and some of the barrel lengths 3", 3.5", 4", 5.25".

In accordance with an embodiment of the present invention, all firearms of a given line of firearms having different barrel lengths are always placed in the same exact place, such that the distance from the alignment structure 12 that abuts against the firearm (in the illustrations, the leftmost end of the ribs 18) to the front surface of the firing pin 32 (in the illustrations, the leftmost end of firing pin 32) is always the same (within a tolerance of typically ±1-2 mm, without limitation).

A safety rod 40 of a fixed length is inserted into barrel 26, such as but not limited to, through an aperture 13 (FIG. 1) in a wall 15 opposite to wall 14 of case 10. The fixed length of safety rod 40 is selected such that it always reaches front surface of the firing pin 32, regardless through which barrel length the rod has to cross. Thus, for a short barrel (e.g., sub-compact) more of the left end of rod 40 is exposed, whereas for a long barrel (e.g., XD$^M$) more of the left end of rod 40 is inside the barrel, but the right end of the rod 40 always reaches the front surface of the firing pin 32 ("reaches" meaning either just touching or spaced therefrom with a small gap, e.g., a few millimeters).

Safety rod 40 can only reach the front surface of the firing pin 32 if the firearm 16 is not cocked and there is no round in the chamber. Thus, by placing firearm 16 in the case 10 with safety rod 40 in place in the barrel 26, the user is assured that firearm 16 is safely stored, not cocked and with no round in the chamber. Unlike the prior art, a single carrying case is used for an entire line of firearms having different lengths of barrels.

Reference is now made to FIGS. 5 and 6. In accordance with an embodiment of the present invention, an end of safety rod 40 opposite the end that reaches the firing pin includes a receptacle 42 for receiving therein a lock 44. In the illustrated non-limiting embodiment, lock 44 is a vending machine type of lock, well known in the art of locks, that has a keyway 46 for inserting therein a key (not shown), which when turned, actuates a locking tongue 48 for locking rod 40 to firearm 16 and/or to the case 10, wherein locking tongue 48 catches onto a portion of firearm 16 (e.g., an inner surface of the barrel) and/or case 10 (e.g., a guide member 49). Other types of locks can also be used.

Safety rod 40 may also serve as a cleaning rod for cleaning firearm 16. For example, the end of safety rod 40 near the firing pin may be formed with an aperture 50 (e.g., an elongated slot) for receiving therein a cleaning cloth or patch (not shown) and/or with an aperture 52 (e.g., a threaded hole) for receiving therein a cleaning brush (not shown). Apertures 50 and 52 may be transverse to each other.

Figures 7, 8:
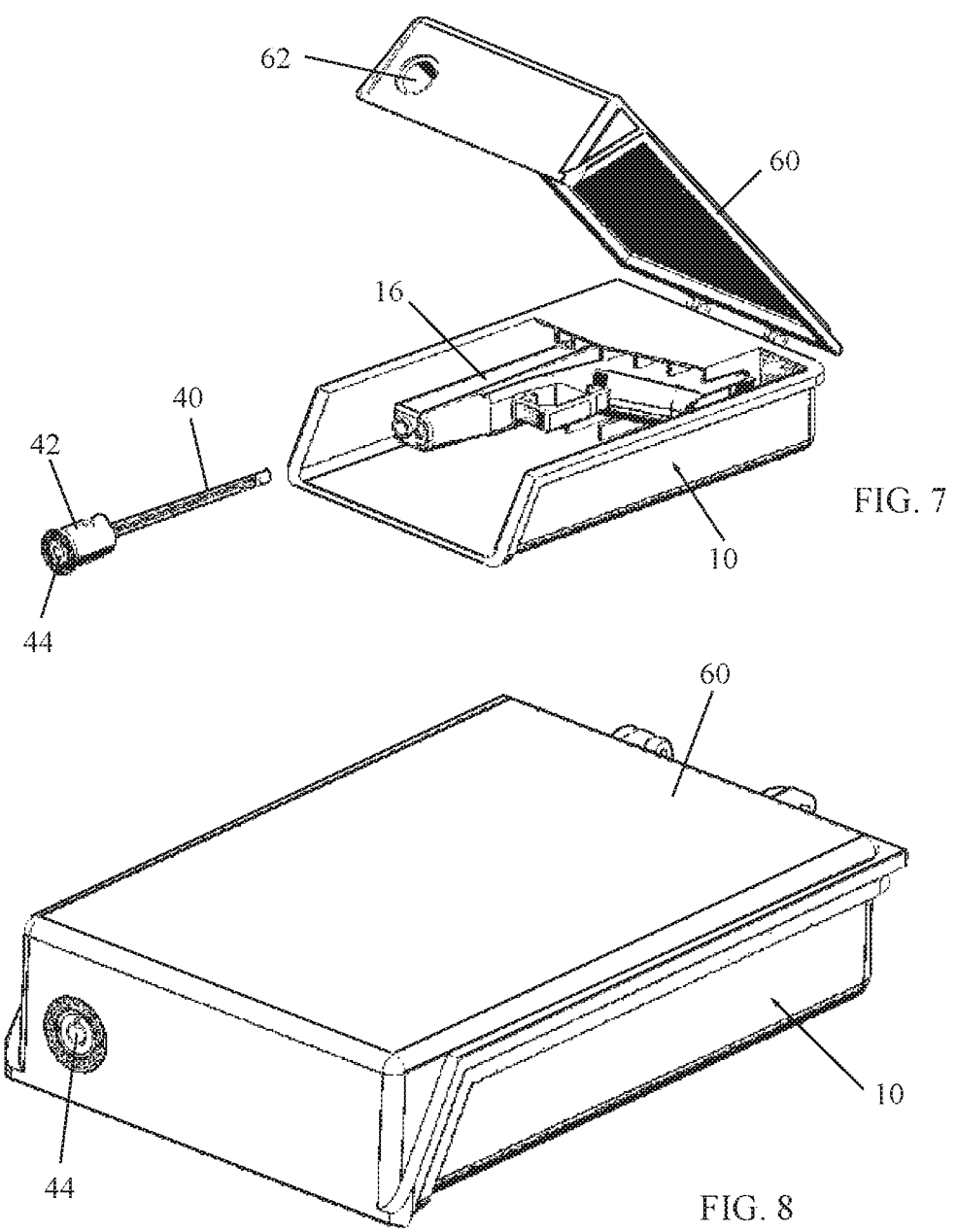
FIGS. 7 and 8 are simplified pictorial illustrations of the firearm case with a hinged cover in open and closed positions, in accordance with an embodiment of the present invention.

Reference is now made to FIGS. 6 and 7. In accordance with an embodiment of the present invention, firearm case 10 may include a hinged cover 60 with an aperture 62 for passing through rod 40 and lock 44.

Referring again to FIG. 1, in accordance with another embodiment of the invention, the firearm carrying case 10 includes a recharger 80 for recharging batteries of electronic devices, such as but not limited to, electrically operated firearms or firearm accessories (such as lights or sights), personal communication devices and more. The recharger 80 may be in electrical communication with an access port 82, such as but not limited to, a USB port, located in a portion of case 10.

Optionally, recharger 80 may be a charged battery that can be used as a recharging device for another battery or another device or another accessory or the weapon itself. Accordingly, recharger 80 may be a charged battery/energy reservoir of any kind, for example two separate chemical materials that once mixed emit energy and can be used as a long shelf life battery.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. Apparatus for storing therein a firearm comprising:
   a firearm case comprising walls and defining therein a volume for storing therein a firearm; and
   a recharger configured for recharging a battery of an external electronic device, which is external to said firearm case, said recharger being in electrical communication with an access port located in a portion of said firearm case and said access port being configured to electrically connect to the external electronic device, and a safety rod for insertion into a barrel of the firearm.

2. The apparatus according to claim 1, wherein said safety rod has a fixed length for insertion into the barrel of the firearm, the fixed length being such that an end of said safety rod always reaches a front surface of a firing pin of the firearm.

3. The apparatus according to claim 2, wherein an end of said safety rod opposite the end that reaches the firing pin comprises a receptacle in which a lock is disposed for locking said safety rod to at least one of said firearm case and the firearm.

4. The apparatus according to claim 1, wherein said safety rod is formed with an aperture for receiving therein a cleaning cloth.

5. The apparatus according to claim 1, wherein said safety rod is formed with an aperture for receiving therein a cleaning brush.

6. The apparatus according to claim 1, wherein said safety rod is formed with an aperture for receiving therein a cleaning brush and another aperture for receiving therein a cleaning brush, the two apertures being transverse to each other.

7. The apparatus according to claim 1, wherein said access port comprises a USB port.

\* \* \* \* \*